United States Patent
Kunz et al.

(10) Patent No.: US 9,108,514 B2
(45) Date of Patent: Aug. 18, 2015

(54) CONTROL DEVICE AND METHOD FOR OPERATING A BRAKING SYSTEM EQUIPPED WITH AN ELECTRIC DRIVE DEVICE AND/OR GENERATOR DEVICE

(75) Inventors: Michael Kunz, Steinheim An Der Murr (DE); Werner Quirant, Beilstein (DE); Niccolo Haegele, Vaihingen/Enz (DE); Jens Kolarsky, Bietigheim/Bissingen (DE); Stefan Strengert, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 5 days.

(21) Appl. No.: 13/881,689

(22) PCT Filed: Sep. 1, 2011

(86) PCT No.: PCT/EP2011/065107
§ 371 (c)(1),
(2), (4) Date: Jul. 30, 2013

(87) PCT Pub. No.: WO2012/055616
PCT Pub. Date: May 3, 2012

(65) Prior Publication Data
US 2013/0297170 A1    Nov. 7, 2013

(30) Foreign Application Priority Data
Oct. 27, 2010    (DE) .................... 10 2010 042 995

(51) Int. Cl.
*B60L 7/18*    (2006.01)
*B60T 17/22*    (2006.01)
(Continued)

(52) U.S. Cl.
CPC . *B60L 7/18* (2013.01); *B60T 8/267* (2013.01); *B60T 8/4072* (2013.01); *B60T 8/4872* (2013.01);
(Continued)

(58) Field of Classification Search
CPC ..... B60T 13/586; B60T 17/22; B60T 17/226; B60L 7/18

USPC ............................................................. 701/70
See application file for complete search history.

(56) References Cited

U.S. PATENT DOCUMENTS

| 4,181,366 A * | 1/1980 | Dobner ............................. 303/3 |
| 4,188,070 A * | 2/1980 | Grenier ............................ 303/3 |

(Continued)

FOREIGN PATENT DOCUMENTS

| CN | 101516667 | 8/2009 |
| CN | 101631705 | 1/2010 |

(Continued)

OTHER PUBLICATIONS

JPO machine translation of JP 2006-205912 (original JP document published Aug. 10, 2006).*

(Continued)

*Primary Examiner* — Behrang Badii
*Assistant Examiner* — David Testardi
(74) *Attorney, Agent, or Firm* — Kenyon & Kenyon LLP

(57) ABSTRACT

A control device for a braking system equipped with an electric drive device and/or generator device includes: a first receiving device with the aid of which a specified value regarding a brake pressure in at least one wheel brake cylinder of at least one brake circuit is receivable, a second receiving device with the aid of which an actual value regarding a pressure in the at least one brake circuit and/or the brake pressure in the at least one wheel brake cylinder is/are receivable, and a control unit with the aid of which a setpoint mode of the electric drive device and/or generator device is specifiable taking the received specified value and the received actual value into account.

12 Claims, 3 Drawing Sheets

(51) Int. Cl.
  *B60T 13/58* (2006.01)
  *B60T 8/26* (2006.01)
  *B60T 8/40* (2006.01)
  *B60T 8/48* (2006.01)
  *B60T 8/88* (2006.01)

(52) U.S. Cl.
  CPC .............. *B60T 8/885* (2013.01); *B60T 13/586* (2013.01); *B60T 17/22* (2013.01); *B60T 2270/402* (2013.01); *B60T 2270/403* (2013.01); *B60T 2270/604* (2013.01); *B60T 2270/608* (2013.01)

(56) References Cited

U.S. PATENT DOCUMENTS

| | | | | |
|---|---|---|---|---|
| 5,716,108 | A | * | 2/1998 | Asa et al. ............................ 303/3 |
| 6,062,657 | A | * | 5/2000 | Dimasi .................... 303/122.13 |
| 6,116,368 | A | * | 9/2000 | Lyons et al. ................... 180/165 |
| 7,393,065 | B2 | * | 7/2008 | Craig et al. .............. 303/122.09 |
| 8,608,256 | B2 | * | 12/2013 | Park .............................. 303/152 |
| 8,630,759 | B2 | * | 1/2014 | Bauerle ........................... 701/22 |
| 2006/0131956 | A1 | | 6/2006 | Matsuura et al. |
| 2010/0222978 | A1 | | 9/2010 | Kodama et al. |

FOREIGN PATENT DOCUMENTS

| | | | | | |
|---|---|---|---|---|---|
| JP | 07228241 | A | * | 8/1995 | .............. B60T 13/58 |
| JP | 08098312 | A | * | 4/1996 | ................ B60L 7/24 |
| JP | 11098608 | A | * | 4/1999 | ................ B60L 7/24 |
| JP | 2001268703 | A | * | 9/2001 | ................ B60L 7/22 |
| JP | 2004187445 | A | * | 7/2004 | ................ B60L 7/00 |
| JP | 2005324711 | A | * | 11/2005 | ................ B60T 8/00 |
| JP | 2006027310 | A | * | 2/2006 | |
| JP | 2006205912 | A | * | 8/2006 | |
| JP | 2008074135 | A | * | 4/2008 | |

OTHER PUBLICATIONS

JPO machine translation of JP 2004-187445 (original JP document published Jul. 2, 2004).*
Research Disclosure 344096, Dec. 1992, 2 pages (plus cover sheet).*
Write.Com forum post, "The use of whether/or", last replied to on Apr. 18, 2012, two pages.*
International Search Report for PCT/EP2011/065107, dated Nov. 29, 2011.

* cited by examiner

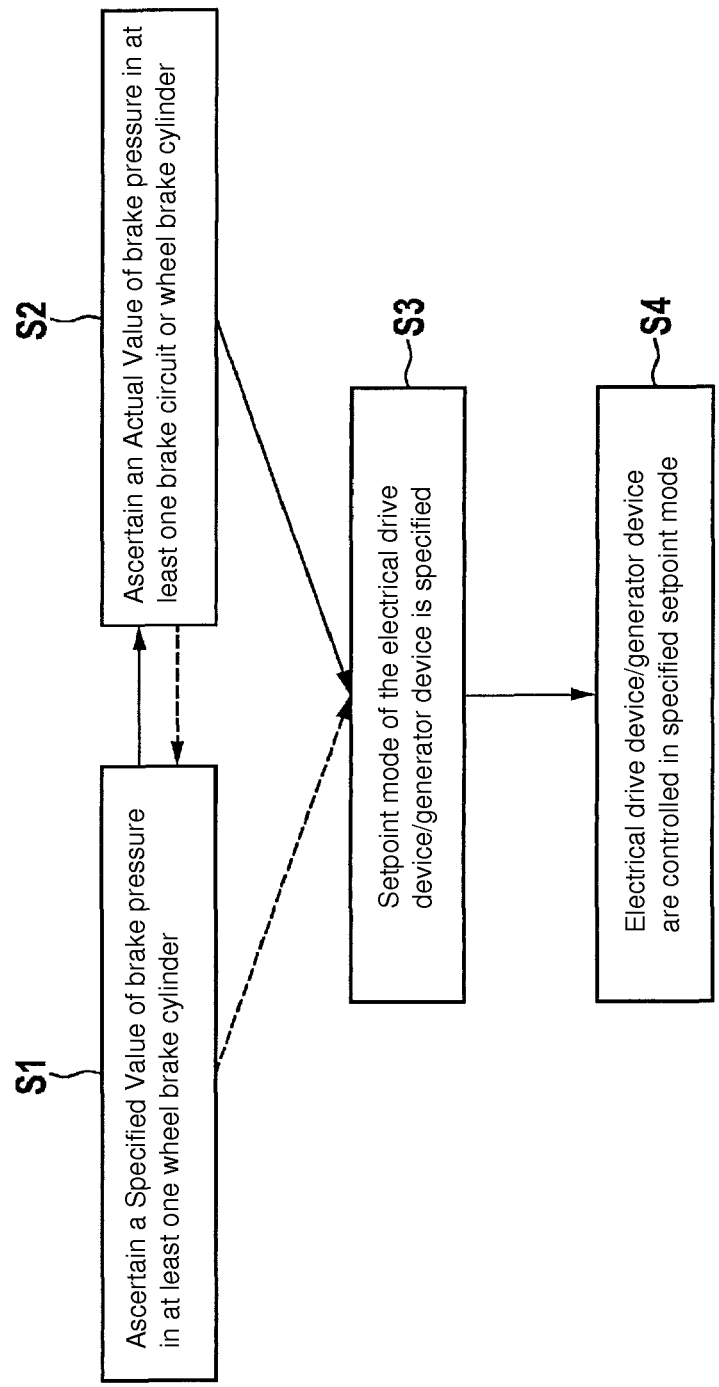

CONTROL DEVICE AND METHOD FOR OPERATING A BRAKING SYSTEM EQUIPPED WITH AN ELECTRIC DRIVE DEVICE AND/OR GENERATOR DEVICE

BACKGROUND OF THE INVENTION

1. Field of the Invention

The present invention relates to a control device for a braking system equipped with an electric drive device and/or generator device. Moreover, the present invention relates to a method for operating a braking system equipped with an electric drive device and/or generator device.

2. Description of the Related Art

A braking system of a motor vehicle generally has two brake circuits, each having two brake cylinders (wheel brake cylinders). In a vehicle having an axle-specific brake circuit distribution, the two brake cylinders of each brake circuit are associated with the wheels of a shared axle. In contrast, in an X brake circuit distribution, a first brake cylinder of one brake circuit is associated with a front wheel, and a second brake cylinder of the same brake circuit is associated with a rear wheel.

A vehicle having a uniform or a rear axle-loaded distribution of the vehicle weight may be equipped with a braking system having an axle-specific brake circuit distribution. However, the generator to be mounted in a hybrid or electric vehicle, the cooperating battery, and the additional electronics system frequently increase the overall weight of the vehicle and/or result in more uneven weight distribution on the vehicle. However, to allow a good minimum deceleration of the vehicle to still be achieved, even when one brake circuit fails, a vehicle having a comparatively high front axle load component is not customarily equipped with an axle-specific braking system. A vehicle having an X brake circuit distribution and at least one generator is described in published German patent application document DE 10 2007 036 260 A1, for example.

BRIEF SUMMARY OF THE INVENTION

The present invention ensures a control device and a method for recognizing a functional impairment of at least one brake circuit of a braking system of the vehicle, and for compensating for/bridging the recognized functional impairment of the at least one brake circuit by applying an additional braking torque and/or a drive torque which brake(s) the vehicle with the aid of the electric drive device and/or generator device. By advantageously specifying the setpoint mode and controlling the electric drive device and/or generator device into the specified setpoint mode, the electric drive device and/or generator device may be used in such a way that the functional impairment of the at least one brake circuit, in particular also a functional failure of the at least one brake circuit, is compensated for or reduced. The present invention thus ensures reliable braking of the vehicle, even when there is a significant functional impairment of the at least one brake circuit.

In one advantageous specific embodiment of the control device, a setpoint mode of the electric drive device and/or generator device is additionally specifiable with the aid of the control unit, at least taking the received specified value and the received actual value into account, in which a generator braking torque is exertable on at least one wheel and/or at least one axle with the aid of the electric drive device and/or generator device. In particular, the setpoint mode may be specifiable taking into account a deviation of the received specified value from the received actual value. The generator braking torque exerted by the electric drive device and/or generator device may thus correspond to the failed hydraulic braking torque of the brake circuit having impaired functionality.

Alternatively or additionally, a setpoint mode of the electric drive device and/or generator device may be additionally specifiable with the aid of the control unit, at least taking the received specified value and the received actual value into account, in which a drive torque directed opposite to an instantaneous direction of movement of the vehicle is exertable on the at least one wheel and/or the at least one axle with the aid of the electric drive device and/or generator device. Thus, the present invention ensures another option for increasing the braking effect by use of the electric motor and/or the generator in a motor mode opposite to the direction of movement of the vehicle. The deviation of the received specified value from the received actual value may be taken into account, even when the setpoint mode with the drive torque directed opposite to the direction of movement of the vehicle is specified. A predefined overall vehicle deceleration is thus maintainable, even in this setpoint mode.

In one advantageous refinement, the control device also includes a third receiving device which is designed in such a way that a state of charge value of a battery associated with the electric drive device and/or generator device is receivable with the aid of the third receiving device. Furthermore, the control device may also include a comparator which is designed in such a way that the received state of charge value may be compared to a predefined threshold value with the aid of the comparator. The usability of a generator and/or an electric drive device is often a function of the state of charge of the battery connected thereto. By receiving the state of charge value and comparing the received state of charge value to the predefined threshold value, the generator and/or the electric drive device may be used in a targeted manner in adaptation to the state of charge of the battery. For example, using the generator when the battery is almost in a discharged state is particularly advantageous. In contrast, functional impairments of the generator may occur when the generator is used despite the battery being fully charged. In addition, reliable use of the electric drive device is generally ensured only if the power necessary for this purpose is stored in the battery. However, the advantageous usability of the electric drive device and/or generator device is easily achievable with the aid of the refinement described in this paragraph.

For example, if the state of charge value is above the predefined threshold value, an activation signal is outputtable to at least one power consumer in the vehicle with the aid of the comparator. This is particularly advantageous if the battery of the hybrid or electric vehicle is almost completely charged at the moment of the brake circuit failure, in particular at the front axle. Due to the additional activation of at least one electrical consumer with the aid of the power management system implemented by the comparator, the situation in which no, or only a limited, braking effect is produced in the generator mode due to the fully charged battery may be prevented. In other words, the power requirement additionally generated by the comparator allows a higher power recuperation with the aid of the generator, and thus ensures a greater braking effect of the generator.

With the aid of the activation signal, at least one heating and/or cooling device as power consumer(s) in the vehicle is/are advantageously controllable from a first operating mode into a second operating mode which has greater power consumption compared to the first operating mode. A heating and/or cooling device is generally a high-power consumer whose system response/activation is not perceived by the driver until after a certain period of time. Thus, with the aid of the comparator, the advantageous power management system ensures rapid consumption of power which does not impair/ disturb the driver, so that a greater braking effect of the generator is achievable. This may also be referred to as active activation/deactivation of high-power consumers (without request by the driver). An advantageously usable heating and/or cooling device may, for example, be a seat heater, a rear window defroster, and/or an air conditioner of the vehicle.

In another advantageous refinement, if the state of charge value is below the predefined threshold value, the control unit is controllable with the aid of the comparator into a generator activation mode in which the setpoint mode with the generator braking torque is specifiable with the aid of the control unit, and if the state of charge value is above the predefined threshold value, the control unit is controllable with the aid of the comparator into a drive activation mode in which the setpoint mode with the drive torque which is directed opposite to the instantaneous direction of movement of the vehicle is specifiable with the aid of the control unit. In other words, when the battery is in a low state of charge, the electric drive device and/or generator device is/are controlled into a generator mode, while for a (practically) fully charged battery, the electric drive device and/or generator device in the motor mode provide(s) the contribution to the braking power specified by the control device. Thus, in this refinement of the present invention the electric drive device and/or generator device may be advantageously used, taking the instantaneous state of charge of the battery into account.

At least one first sensor signal of a braking distance sensor and/or of a brake force sensor is preferably receivable as the specified value, and at least one second sensor signal of at least one pressure sensor of the at least one brake circuit is preferably receivable as the actual value. The received sensor signals are subsequently evaluatable as described above with the aid of the control unit in order to specify the advantageous setpoint mode. A vehicle, in particular a hybrid vehicle or an electric vehicle, generally has a braking distance sensor (pedal travel sensor) or a brake force sensor (pedal force sensor). In addition, at least one pressure sensor is customarily already present at a brake circuit of a braking system. The present invention thus ensures recognition of a brake circuit failure, using components already present in the vehicle. Furthermore, a circuit failure may be easily recognized if the first sensor signal indicates a brake actuation, but due to the second sensor signal no pressure build-up is determinable at the pressure sensor. The sensor signals may thus be advantageously evaluated, with the aid of an inexpensive electronics system, for advantageous recognition of a brake circuit failure.

The above-described advantages are also ensured for a braking system having a correspondingly designed control device and at least one brake circuit having at least one wheel brake cylinder. In particular, the braking system may include at least two brake circuits, each having two wheel brake cylinders associated with a shared wheel axle.

The present invention thus ensures an option, in addition to exerting the braking torque of the brake circuit which is not yet functionally impaired, of exerting a further delay element on the at least one wheel of the vehicle with the aid of the electric drive device and/or generator device. The mountable delay element is large enough to also compensate for the failure of a brake circuit of the front axle of a vehicle having a high front axle load and an axle-specific brake circuit distribution. A high safety standard is thus achievable with the aid of the present invention, even for a vehicle having a high front axle load and an axle-specific brake circuit distribution.

Thus, by use of the present invention there is no need for an X brake circuit distribution in a vehicle having a high front axle load. An axle-specific brake circuit distribution may therefore also be used in a hybrid vehicle and in an electric vehicle despite the additional weight of the generator, the battery, and the additional electronics system, as well as the associated weight redistribution. This is associated with the advantage that braking systems having an axle-specific distribution generally have a higher regenerative efficiency, at much lower cost, than comparable braking systems having an X brake circuit distribution. In addition, a braking system having an axle-specific distribution may be equipped with a generator with less effort. Likewise, braking systems having an axle-specific brake circuit distribution require much less complexity for blending.

In addition, the present invention makes it easier for a vehicle manufacturer to equip numerous different vehicle models with a braking system. This is particularly true when one vehicle platform is used for different vehicle designs in order to reduce development costs and effort. Vehicle designs having different weight distributions are often present within one vehicle platform. However, with the aid of the present invention, all vehicle designs may be equipped with a braking system having an axle-specific brake circuit distribution, regardless of their weight distribution. Ordinarily, it is necessary to provide braking systems having different brake circuit distributions in one vehicle platform, or to use the X brake circuit distribution in various vehicle platforms. However, due to the present invention this is no longer necessary. Thus, the customary increased level of effort to be expended in producing and safeguarding the different variants of the vehicles is dispensed with.

The use of the present invention in a hybrid vehicle or an electric vehicle avoids the usually necessary rearrangement of the brake circuit distribution within one vehicle platform as a function of the particular weight distribution.

Instead, by use of the present invention an axle-specific brake circuit distribution may always be used, regardless of the particular weight distribution. The variant diversity, the production effort, and therefore the costs may thus be greatly reduced in the vehicle manufacture.

Another option for achieving the above-described advantages is a corresponding refinement of the method for operating a braking system equipped with an electric drive device and/or generator device.

BRIEF DESCRIPTION OF THE DRAWINGS

FIG. 3 shows a flow chart for illustrating one specific embodiment of the method for operating a braking system equipped with an electric drive device and/or generator device.

DETAILED DESCRIPTION OF THE INVENTION

Figure 1:
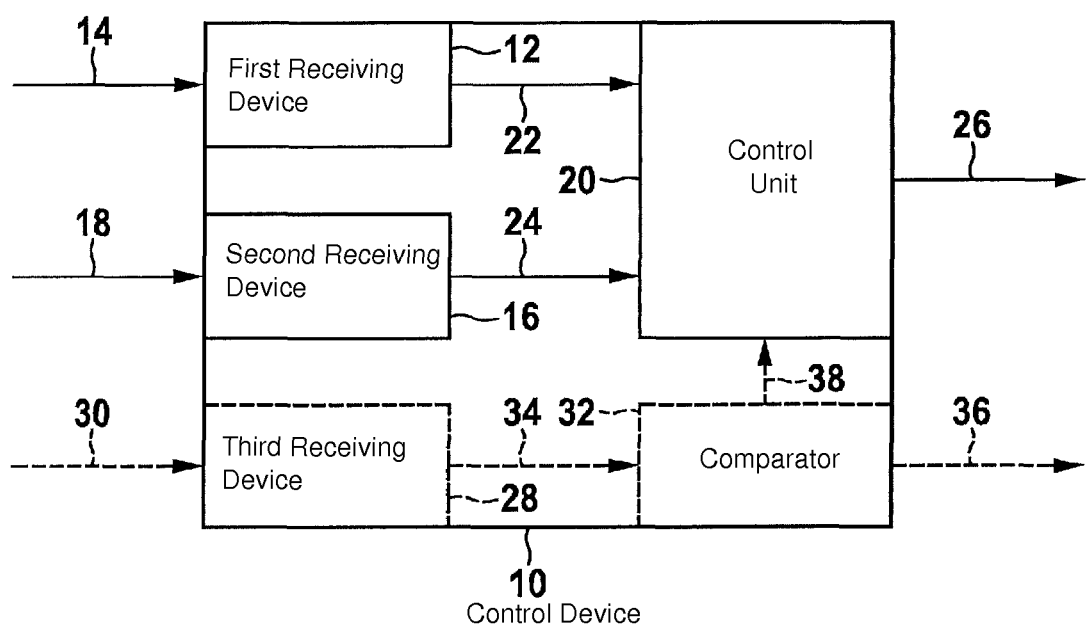
FIG. 1 shows a schematic illustration of one specific embodiment of the control device.

FIG. 1 shows a schematic illustration of one specific embodiment of the control device.

A braking system having an electric drive device and/or generator device may be operated with the aid of control device 10 schematically depicted in FIG. 1. The electric drive device and/or generator device may be understood to be a generator and/or an electric drive motor. In particular, the electric drive device and/or generator device may be designed as a generator for charging a battery and also as a drive motor for accelerating the vehicle thus equipped and consuming power provided by the battery. Control device 10 is not limited to the cooperation of a certain type of generator and/or electric drive motor.

Control device 10 has a first receiving device 12, with the aid of which a specified value 14 regarding a (setpoint) brake pressure in at least one wheel brake cylinder of at least one brake circuit of a braking system of the vehicle equipped with control device 10 is receivable. Specified value 14 may include, for example, information concerning an actuation of a brake input element of the vehicle by a driver, such as a braking force value and/or a braking distance value in particular. For example, specified value 14 may include at least one first sensor signal of a braking distance sensor (pedal travel sensor) and/or of a brake force sensor (pedal force sensor). Since a braking distance sensor and/or a brake force sensor is/are customarily already installed in a vehicle, control device 10 may thus be used without additionally using further sensors on the vehicle which cooperate with the control device. However, the specified value is not limited to the examples described here.

An actual value 18 regarding an (instantaneously present) pressure in the at least one brake circuit and/or an (instantaneously present) brake pressure in the at least one wheel brake cylinder of the at least one brake circuit is receivable with the aid of a second receiving device 16 of control device 10. In particular, at least one second sensor signal of at least one pressure sensor which is connected to at least one brake circuit of the braking system may be receivable as actual value 18. Thus, a sensor which is generally already installed in the vehicle may also be used for ascertaining actual value 18. However, actual value 18 may include a different sensor signal instead of or in addition to a pressure signal.

Control device 10 also includes a control unit 20 at which a first output signal 22 corresponding to specified value 14 is provided by first receiving device 12, and at which a second output signal 24 corresponding to actual value 18 is provided by second receiving device 16. Control unit 20 is designed in such a way that a setpoint mode of the electric drive device and/or generator device (not illustrated) is specifiable with the aid of control unit 20, taking received specified value 14 and received actual value 18, i.e., output signals 22 and 24, respectively, into account. Control unit 20 preferably specifies the setpoint mode of the electric drive device and/or generator device, taking into account a comparison/an evaluation of received specified value 14 and received actual value 18, i.e., output signals 22 and 24, respectively. The electric drive device and/or generator device is/are subsequently controlled into the specified setpoint mode with the aid of a control signal 26 corresponding to the specified setpoint mode.

For example, with the aid of control unit 20 a setpoint mode of the electric drive device and/or generator device may be specifiable, by at least taking into account received specified value 14 and received actual value 18, in which a generator braking torque, advantageously corresponding to a deviation of received specified value 14 from received actual value 18, is exertable on at least one wheel and/or at least one axle of the vehicle with the aid of the electric drive device and/or generator device. This advantageous specification of the setpoint mode is achievable by an easily made comparison of values 14 and 18, i.e., output signals 22 and 24, respectively. After the control as a generator with the aid of control signal 26, the electric drive device and/or generator device produce(s) the braking power required by control unit 20 in the generator mode, regardless of whether or not the functionality of the brake circuit of the braking system is present. This applies to the functionality of the front axle brake circuit as well as to the functionality of the rear axle brake circuit. The use of the electric drive device and/or generator device as a generator has the additional advantage that reliable braking of the vehicle is ensurable, even when the vehicle battery is in a nearly discharged state.

As an alternative or optional approach, a setpoint mode of the electric drive device and/or generator device may be specifiable with the aid of control unit 20, at least taking into account received specified value 14 and received actual value 18, in which a drive torque directed opposite to an instantaneous direction of movement of the vehicle is exertable on at least one wheel and/or at least one axle with the aid of the electric drive device and/or generator device. In this case, the electric drive device and/or generator device is actively controlled as an electric drive motor in such a way that a drive torque opposite to the instantaneous direction of movement of the vehicle is generated. Since power is necessary for generating the drive torque, this process is associated with a discharge of the vehicle battery. It is thus possible to generate the drive torque opposite to the instantaneous direction of movement of the vehicle, even with a fully charged vehicle battery. An additional/artificial discharge of the vehicle battery during generation of the drive torque is therefore not necessary. In addition, the drive torque may be generated regardless of whether or not the functionality of the brake circuit of the braking system is present.

The activation of the electric drive device and/or generator device as a generator and/or as an electric drive device with the aid of control unit 20 ensures, in a simple manner, a significant increase in the generatable overall braking torque. Due to its design described above, control unit 20 is also designed in particular to recognize, by comparing/evaluating values 14 and 18, i.e., output signals 22 and 24, respectively, a functional impairment or a failure of a brake circuit with regard to which values 14 and 18 are received. If a brake circuit failure is recognized by control unit 20, control unit 20 may specify a setpoint mode of the electric drive device and/or generator device in which the electric drive device and/or generator device function(s) as an additional brake actuator. In particular, by specifying the setpoint mode and outputting control signal 26, control unit 20 may control the electric drive device and/or generator device in such a way that the absent hydraulic braking torque of the functionally impaired and/or failed brake circuit is compensatable.

Optionally, control device 10 may additionally include a third receiving device 28 with the aid of which a state of charge value 30 of a battery (not illustrated), which is connected to the electric drive device and/or generator device, is receivable. Furthermore, control device 10 may also have a comparator 32 with the aid of which a third output signal 34 of the third receiving device corresponding to state of charge value 30 may be compared to a predefined threshold value. Equipping control device 10 with units 28 and 32 has the advantage that the electric drive device and/or generator device may be used more efficiently, taking the state of charge of the battery into account.

For example, after a recognition that state of charge value 30, i.e., third output signal 34, is above the predefined threshold value, comparator 32 may output an activation signal 36 to at least one power consumer in the vehicle. With the aid of activation signal 36, at least one heating and/or cooling device as a power consumer in the vehicle may advantageously be controllable from a first operating mode into a second operating mode having a greater power consumption compared to the first operating mode. Activation signal 36 is preferably output to at least one high-power consumer, for example a seat heater, a rear window defroster, and/or an air conditioner. Since the driver generally does not notice an activation of this type of (high-) power consumer until after a certain period of time, a (brief) partial discharge of the vehicle battery may be carried out without an associated loss of comfort for the driver. As a result of the rapid partial discharge of the vehicle battery, the braking effect of the generator is increasable compared to a generator braking effect when the vehicle battery is fully charged.

In another preferred specific embodiment, comparator 32 outputs a switching signal 38 to control unit 20 as a function of a comparison of the predefined threshold value to state of charge value 30, i.e., third output signal 34. For a state of charge value 30 below the predefined threshold value, i.e., for a corresponding third output signal 34, switching signal 38 advantageously switches control unit 20 into a generator activation mode. In the generator activation mode, control unit 20 is designed to specify a setpoint mode having a generator braking torque, preferably corresponding to the deviation of received specified value 14 from received actual value 18. Another way to describe this is that when the battery has a low state of charge, the electric drive device and/or generator device is/are activatable by control unit 20 as a generator for ensuring the additional vehicle deceleration.

If state of charge value 30, i.e., third output signal 34, is above the predefined threshold value, control unit 20 is preferably switched into a drive activation mode with the aid of switching signal 38. In the drive activation mode, a setpoint mode with a drive torque which is directed opposite to the instantaneous direction of movement of the vehicle is specifiable with the aid of control unit 20. Thus, the electric drive device and/or generator device is/are activatable by control unit 20, which is switched into the drive mode, in such a way that as an electric drive motor the electric drive device and/or generator device exert(s) a drive torque which is directed opposite to the instantaneous direction of movement of the vehicle on at least one wheel and/or one axle of the vehicle.

By switching control unit 20 into the generator activation mode or into the drive activation mode, taking instantaneous state of charge value 30 into account, it is not necessary to partially discharge the vehicle battery by activating a power consumer in the vehicle. At the same time, in this case the electric drive device and/or generator device may be used as a drive motor or as a generator in such a way that its function is optimized with respect to the state of charge of the battery.

In one refinement, the threshold value may be predefined, taking a state of at least one vehicle component and/or at least one driving mode of the vehicle into account. For example, for a high vehicle speed, a threshold value may be predefined which is different from that for a low vehicle speed. Likewise, for city traffic, in which the vehicle is braked more often and the driver therefore makes more frequent requests for acceleration of the vehicle, the threshold value may be specified at a higher value than for traveling on a highway.

At least one sensor which provides value 14, 18, and/or 30 may be designed as a subunit of control device 10. Receiving the at least one value 14, 18, and/or 30 may thus also be understood to mean accepting a signal which is provided by an internal sensor. However, the at least one sensor for providing value 14, 18, and/or 30 may also be situated separately from control device 10, and may communicate with same via a vehicle bus, for example.

Figure 2:
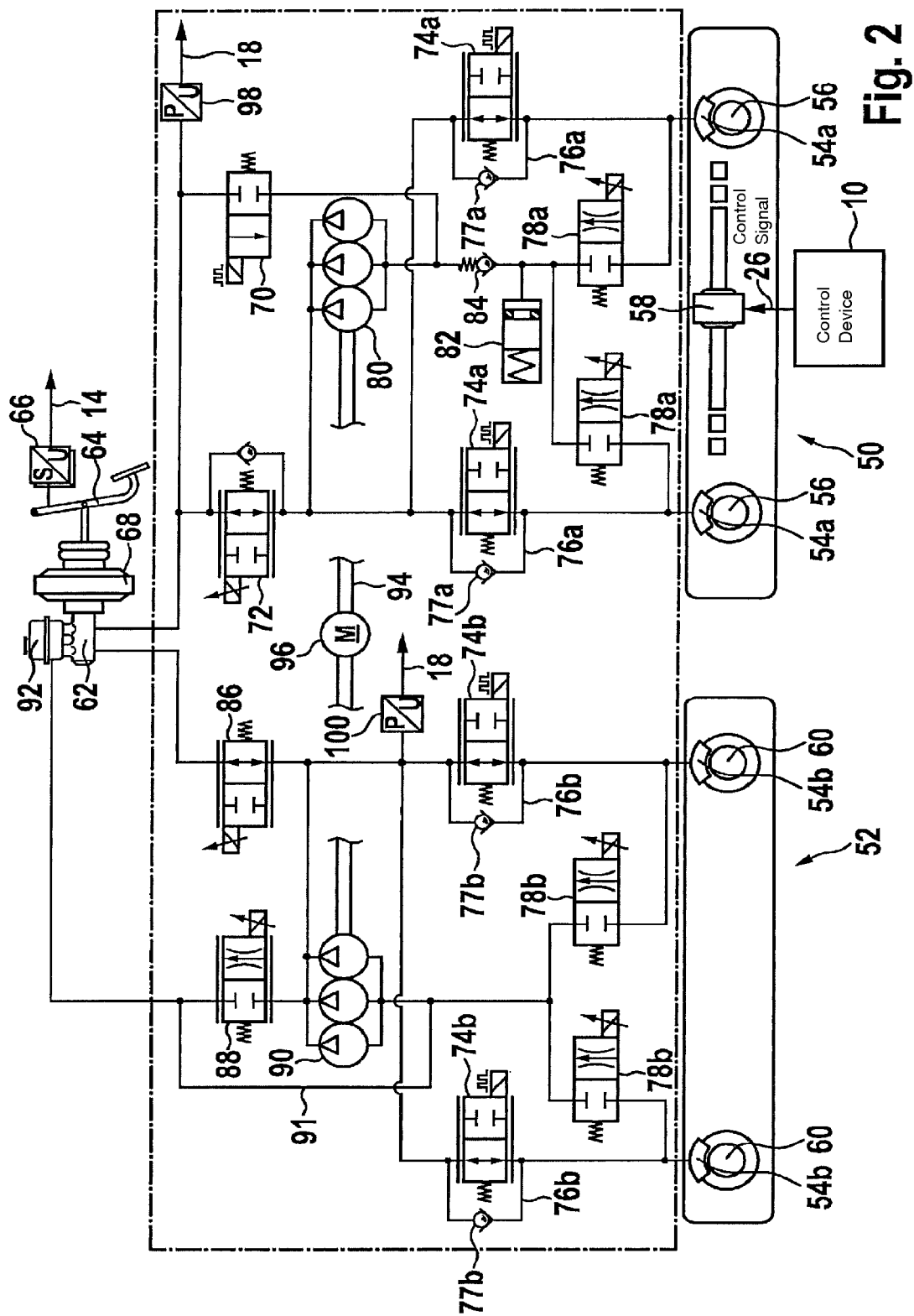
FIG. 2 shows a schematic illustration of one specific embodiment of the braking system.

FIG. 2 shows a schematic illustration of one specific embodiment of the braking system.

The braking system equipped with control device 10 described above has a first brake circuit 50 and a second brake circuit 52, each having two wheel brake cylinders 54a and 54b, respectively. Two wheels 56 situated on the front axle are associated with the two wheel brake cylinders 54a of first brake circuit 50. A generator 58 as an electric drive device and/or generator device, which is controllable with the aid of control signal 26, is also situated on the front axle. Wheels 60 on the rear axle are associated with the two wheel brake cylinders 54b of second brake circuit 52.

The braking system described here, despite its axle-specific brake circuit distribution and a possible front axle-loaded distribution of the vehicle weight, ensures the safety standard of a braking system having an X brake circuit distribution, even if a functional impairment or a failure of one of the two brake circuits 50 or 52 occurs.

It is expressly pointed out that the components of the braking system described below represent only one example of a possible design of the advantageous braking system having control device 10. A primary advantage of the braking system is that brake circuits 50 and 52 are not limited to a certain design or to the use of certain components. Instead, brake circuits 50 and 52 may be modified with a great freedom of choice without compromising the advantages of equipping the braking system with control device 10. It is thus possible to use components 10 and 58 with numerous brake circuit components and with various designs of brake circuits 50 and 52.

The braking system has a brake input element 64, for example a brake pedal, situated at a master brake cylinder 62. A braking distance sensor 66 may be situated at brake input element 64 for providing specified value 14. A brake force sensor/brake pressure sensor may be used as an alternative to braking distance sensor 66. Optionally, the braking system may also include a brake booster 68, for example a hydraulic brake booster or an electromechanical brake booster.

First brake circuit 50 having a main switching valve 70 and a changeover valve 72 is designed in such a way that the driver may directly brake wheel brake cylinders 54a of first brake circuit 50 via master brake cylinder 62. A wheel inlet valve 74a having a bypass line 76a extending parallel thereto, a check valve 77a situated in each bypass line 76a, and a wheel outlet valve 78a are associated with each of the two wheel brake cylinders 54a of first brake circuit 50. In addition, first brake circuit 50 includes a first pump 80 whose suction side is connected to wheel outlet valves 78a and whose pressure side is oriented toward changeover valve 72, a storage chamber 82 coupled between wheel outlet valves 78a and pump 80, and a pressure relief valve 84 situated between first pump 80 and storage chamber 82.

Second brake circuit 52 is designed as a brake circuit which is decoupleable from master brake cylinder 62. For this purpose, second brake circuit 52 has a shutoff valve 86, with the aid of which wheel brake cylinders 54b of second brake circuit 52, wheel inlet valves 74b associated with wheel brake cylinders 54b together with bypass lines 76b situated in parallel and having check valves 77b, and wheel outlet valves 78b associated with wheel brake cylinders 54b are decoupleable from master brake cylinder 62. By closing shutoff valve 86, the actuation of brake input element 64 may be prevented from causing an increase in the brake pressure in wheel brake cylinders 54b of second brake circuit 52. This is particularly advantageous when generator 58 is to be used for charging the vehicle battery (not illustrated) during a braking operation. Since generator 58 exerts an additional generator braking torque on the vehicle, by decoupling wheel brake cylinders 54b of second brake circuit 52 the overall deceleration of the vehicle may be prevented from being greater than a setpoint vehicle deceleration that is predefined by the driver.

In addition, second brake circuit 52 has a continuously regulatable/adjustable/controllable valve 88 and a second pump 90. Continuously controllable valve 88 is hydraulically connected to a braking medium reservoir 92 at master brake cylinder 62. The suction side of second pump 90 is likewise hydraulically connected to braking medium reservoir 92 via a bypass line 91, extending parallel to continuously controllable valve 88 and second pump 90, in such a way that after shutoff valve 86 is closed, a volume of braking medium is pumpable into wheel brake cylinders 54b of second brake circuit 52 via (at least partially opened) wheel inlet valves 74b with the aid of second pump 90. The pressure side of second pump 90 is connected via continuously controllable valve 88 to braking medium reservoir 92 in such a way that after shutoff valve 86 is closed, a volume of braking medium is pumpable from wheel brake cylinders 54b of second brake circuit 52 into braking medium reservoir 92 via (at least partially opened) wheel outlet valves 78b and (at least partially opened) continuously controllable valve 88. Thus, after shutoff valve 86 is closed, the hydraulic braking torque of wheel brake cylinders 54b of second brake circuit 52 may be actively set with the aid of second pump 90 and continuously controllable valve 88. In particular, the hydraulic braking torque of wheel brake cylinders 54b of second brake circuit 52 which are decoupled from master brake cylinder 62 may be set to correspond to a difference between a setpoint total braking torque predefined by the driver and an actual total braking torque composed of the generator braking torque of generator 58 and the hydraulic braking torque of wheel brake cylinders 54a of first brake circuit 50.

Pumps 80 and 90 may each be situated as three-piston pumps on a shared shaft 94 of a motor 96. However, other types of pumps besides three-piston pumps are also usable for pumps 80 and 90.

Components 70 through 96 described in the above paragraphs merely represent examples of equipping a braking system with a decoupleable rear axle. The design of the braking system is not limited to the illustrated modulation system, and instead may be transferred to other conceivable modulation systems. Instead of an axle-specific brake circuit distribution, the braking system may have an X brake circuit distribution.

Each of the two brake circuits 50 and 52 has a pressure sensor 98 and 100 with the aid of which actual value 18 is providable. Control device 10 is designed, as described above, to advantageously control generator 58 based on provided values 14 and 18 with the aid of control signal 26.

In the braking system illustrated here, despite a circuit failure/a functional impairment of first brake circuit 50, the driver may achieve a sufficient minimum deceleration (which is at least the legally prescribed minimum deceleration) with the aid of an advantageously settable brake pressure in wheel brake cylinders 54b of second brake circuit 52 and/or generator 58 which is controlled with the aid of control signal 26. For this purpose, with the aid of specified value 14 the actuation of the brake, for example the resulting measurable braking distance, is output to control device 10. The control device likewise receives actual value 18 from at least one of pressure sensors 98 and 100. Control device 10 is designed to compare/evaluate specified value 14 and actual value 18, and to communicate a setpoint mode, which is specified based on the comparison/the evaluation, to generator 58 with the aid of control signal 26.

In the event of a functional impairment/a failure of second brake circuit 52, a much better braking power is ensurable with the aid of control device 10 in comparison to a conventional braking system having an X brake circuit distribution. While the braking effect in the conventional braking system having an X brake circuit distribution is provided with the aid of a wheel brake cylinder situated on a front wheel and a wheel brake cylinder associated with a rear wheel in the event of a functional impairment/a failure of second brake circuit 52, in the braking system described here the braking effect may be generated by at least the two wheel brake cylinders 54a of first brake circuit 50. Due to the described higher axle load on the front axle, in the braking system described here this braking effect is greater than in the related art with an X brake circuit distribution.

The braking system described here, having an axle-specific brake circuit distribution and a decoupleable rear axle, is thus also suited for vehicles which previously required/made necessary an X brake circuit distribution due to their weight distribution. The braking system is suited in particular for a hybrid or electric vehicle. However, it is pointed out that the braking system described here is not limited to use in a hybrid vehicle or in an electric vehicle. Instead, the braking system described here is usable in all motor vehicles. If more than four wheels are to be brakable using the braking system, at least one of the two brake circuits 50 or 52 may be provided multiple times in the braking system.

In the event of a functional impairment/a failure of one of the two brake circuits 50 and 52, the use of generator 58 activated by control device 10 and/or the active setting of the brake pressure in wheel brake cylinders 54b of second brake circuit 52 with the aid of continuously controllable valve 88 and second pump 90 ensure(s) an earlier braking effect as a response to the actuation of brake input element 64 by the driver in comparison to conventional braking systems having an X brake circuit distribution. In a conventional braking system, in the event of a circuit failure the actuating travel of the brake input element is greatly extended to the first perceivable braking response of the vehicle due to the sequential configuration of the chambers of master brake cylinder 62. Frequently, a driver of a vehicle having a conventional braking system who notices the greatly extended actuating travel therefore perceives a brake circuit failure as a total brake failure. In the braking system described here, despite a circuit failure the braking distance to be covered until the first braking response of the vehicle is reduced to a minimum, which is less than the actuating travel of the brake input element of a conventional braking system for a first perceivable braking response, due to the early recognition of the actuation of brake input element 64 with the aid of braking distance sensor 66 (pedal travel sensor).

FIG. 3 shows a flow chart for illustrating one specific embodiment of the method for operating a braking system equipped with an electric drive device and/or generator device.

The method described below may be carried out, for example, with the aid of the above-described control device or with the aid of the previously explained braking system. However, the practicability of the method described here is not limited to this type of control device or to the braking system.

A specified value regarding a brake pressure in at least one wheel brake cylinder of at least one brake circuit of the braking system is ascertained in a method step S1. Method step S2 includes an ascertainment of an actual value regarding a pressure in the at least one brake circuit and/or the brake pressure in the at least one wheel brake cylinder of the at least one brake circuit. Examples of the ascertained specified value and the ascertained actual value have been described above. Method steps S1 and S2 may be carried out in any desired sequence, or simultaneously.

A setpoint mode of the electric drive device and/or generator device is specified in a further method step S3. This occurs by taking at least the ascertained specified value and the ascertained actual value into account. For example, for this purpose, the ascertained specified value and the ascertained actual value are compared/evaluated. In addition, the setpoint mode in method step S3 may be specified, as described above, also taking into account a state of charge value regarding a state of charge of a battery which is connected to the electric drive device and/or generator device, and a predefined threshold value.

The electric drive device and/or generator device is/are controlled into the specified setpoint mode in a subsequent method step S4. For example, the electric drive device and/or generator device may be controlled into a setpoint mode with a generator braking torque, preferably corresponding to a deviation of the received specified value from the received actual value. As an alternative or optional approach, in method step S4, the electric drive device and/or generator device may be controlled into a setpoint mode with a drive torque directed opposite to an instantaneous direction of movement of the vehicle having the braking system.

What is claimed is:

1. A control device for a braking system of a vehicle equipped with an electric motor that operates as at least one of an electric drive device and a generator device, wherein the braking system includes a brake circuit that includes a wheel brake cylinder, the control device comprising:
    a sensor arrangement; and
    processing circuitry communicatively coupled to the sensor arrangement, wherein:
        based on (a) a first signal received from the sensor arrangement, which specifies a value regarding a targeted pressure in the brake circuit, and (b) a second signal received from the sensor arrangement, which indicates an actual value regarding a pressure in the brake circuit, an impairment of the brake circuit is determinable by the processing circuitry, in response to which impairment determination a mode is set by the processing circuitry in which at least one of the electric drive device and the generator device supplements a hydraulic braking by the brake circuit; and
        whether a generator braking torque or a drive torque is to be used for the supplementing of the hydraulic braking is determinable by the processing circuitry based on a result of a comparison between (a) a state of charge of a battery associated with the electric motor, as indicated by a third signal received from the sensor arrangement, and (b) a predefined threshold value.

2. The control device as recited in claim 1, wherein, when the comparison indicates that the state of charge is below the predefined threshold value, the processing circuitry supplements the hydraulic braking by exerting the generator braking torque on at least one of a wheel and an axle, with the aid of the generator device.

3. The control device as recited in claim 2, wherein the first signal indicates a measurement from at least one of a braking distance sensor and a brake force sensor, and the second signal indicates a measurement from at least one pressure sensor of the at least one brake circuit.

4. The control device as recited in claim 1, wherein, when the comparison indicates that the state of charge is above the predefined threshold value, the processing circuitry supplements the hydraulic braking by exerting the drive torque directed opposite to an instantaneous direction of movement of the vehicle on at least one of a wheel and an axle with the aid of the electric drive device.

5. The control device as recited in claim 1, wherein:
    if the result of the comparison is that the state of charge exceeds the predefined threshold value, an activation signal is outputted to at least one power consumer in the vehicle.

6. The control device as recited in claim 5, wherein the activation signal switches at least one of a heating device and a cooling device operating as a power consumer in the vehicle from a first operating mode into a second operating mode having greater power consumption than the first operating mode.

7. A braking system for a vehicle, comprising:
    an electric motor that operates as at least one of an electric drive device and a generator device;
    at least one brake circuit having at least one wheel brake cylinder;
    a sensor arrangement; and
    processing circuitry, wherein:
        based on (a) a first signal received from the sensor arrangement, which specifies a value regarding a targeted pressure in the brake circuit, and (b) a second signal received from the sensor arrangement, which indicates an actual value regarding a pressure in the brake circuit, an impairment of the brake circuit is determinable by the processing circuitry, in response to which impairment determination a mode is set by the processing circuitry in which at least one of the electric drive device and the generator device supplements a hydraulic braking by the brake circuit; and
        whether a generator braking torque or a drive torque is to be used for the supplementing of the hydraulic braking is determinable by the processing circuitry based on a result of a comparison between (a) a state of charge of a battery associated with the electric motor, as indicated by a third signal received from the sensor arrangement, and (b) a predefined threshold value.

8. The braking system as recited in claim 7, wherein the braking system includes at least two brake circuits each having two wheel brake cylinders which are associated with a shared wheel axle.

9. The braking system as recited in claim 8, wherein at least one of a generator braking torque and a drive torque is exerted on a front axle of the vehicle with the aid of at least one of the electric drive device and the generator device.

10. A method for operating a braking system of a vehicle equipped with an electric motor that operates as at least one of an electric drive device and a generator device, wherein the braking system includes a brake circuit with a wheel brake cylinder, the method comprising:
    obtaining, by processing circuitry and from a sensor arrangement, (a) a first signal, which specifies a value regarding a targeted pressure in the brake circuit, (b) a second signal, which indicates an actual value regarding a pressure in the brake circuit, and (c) a third signal, which indicates a state of charge of a battery associated with the at least one of the electric motor;
    based on the first and second signals, determining, by the processing circuitry, an impairment of the brake circuit;
    responsive to the impairment determination, setting, by the processing circuitry, a mode in which at least one of the electric drive device and the generator device supplements a hydraulic braking by the brake circuit, comparing, by the processing circuitry, the state of charge indicated by the third signal to a predefined threshold value; and based on a result of the comparison, determining, by the processing circuitry, whether a generator braking torque or a drive torque is to be used for the supplementing of the hydraulic braking.

11. The method as recited in claim 10, wherein in the set mode, a generator braking torque is exerted on at least one of a wheel and an axle, with the aid of the generator device.

12. The method as recited in claim 10, wherein in the set mode, a drive torque directed opposite to an instantaneous direction of movement of the vehicle is exerted on at least one of a wheel and an axle with the aid of the electric drive device.

* * * * *